US011881573B2

(12) United States Patent
An et al.

(10) Patent No.: US 11,881,573 B2
(45) Date of Patent: Jan. 23, 2024

(54) BATTERY PACK

(71) Applicant: LG CHEM, LTD., Seoul (KR)

(72) Inventors: Ji Myong An, Cheongju-Si (KR); Seog Jin Yoon, Cheongju-Si (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 45 days.

(21) Appl. No.: 15/780,811

(22) PCT Filed: Sep. 12, 2017

(86) PCT No.: PCT/KR2017/009974
§ 371 (c)(1),
(2) Date: Jun. 1, 2018

(87) PCT Pub. No.: WO2018/052227
PCT Pub. Date: Mar. 22, 2018

(65) Prior Publication Data
US 2019/0288355 A1 Sep. 19, 2019

(30) Foreign Application Priority Data

Sep. 13, 2016 (KR) .......................... 10-2016-0117879

(51) Int. Cl.
*H01M 10/643* (2014.01)
*H01M 10/613* (2014.01)
(Continued)

(52) U.S. Cl.
CPC ..... *H01M 10/643* (2015.04); *H01M 10/0525* (2013.01); *H01M 10/613* (2015.04);
(Continued)

(58) Field of Classification Search
CPC .... H01M 10/63; H01M 10/643; H01M 10/60; H01M 10/613; H01M 10/615; H01M 10/625; H01M 10/6551; H01M 10/6554; H01M 10/0525; H01M 2/1072; H01M 2/1077; H01M 2220/20; H01M 50/20
See application file for complete search history.

(56) References Cited

U.S. PATENT DOCUMENTS

2012/0092018 A1\* 4/2012 Scheucher ............ B60L 53/305
324/426
2012/0141857 A1 6/2012 Nakashima et al.
(Continued)

FOREIGN PATENT DOCUMENTS

CN 104253254 A 12/2014
CN 105870543 A 8/2016
(Continued)

OTHER PUBLICATIONS

JP200713939A Morita Espacenet machine translation (Year: 2007).\*
(Continued)

*Primary Examiner* — Amanda C. Walke
(74) *Attorney, Agent, or Firm* — Birch, Stewart, Kolasch & Birch, LLP

(57) ABSTRACT

The present disclosure relates to a battery pack, and more particularly, to a battery pack, the temperature of which is maintained within a certain range by a heating component or a heat dissipating component attached thereto.

4 Claims, 3 Drawing Sheets

(51) Int. Cl.
*H01M 10/615* (2014.01)
*H01M 10/625* (2014.01)
*H01M 10/6551* (2014.01)
*H01M 10/6554* (2014.01)
*H01M 10/0525* (2010.01)
*H01M 50/213* (2021.01)
*H01M 50/271* (2021.01)

(52) U.S. Cl.
CPC ....... *H01M 10/615* (2015.04); *H01M 10/625* (2015.04); *H01M 10/6551* (2015.04); *H01M 10/6554* (2015.04); *H01M 50/213* (2021.01); *H01M 50/271* (2021.01); *H01M 2220/20* (2013.01)

(56) References Cited

U.S. PATENT DOCUMENTS

| | | | |
|---|---|---|---|
| 2014/0045037 A1* | 2/2014 | Nishikawa | H01M 2/0277 429/156 |
| 2014/0065455 A1 | 3/2014 | Chuang et al. | |
| 2016/0285140 A1* | 9/2016 | Kimura | H01M 10/6562 |
| 2018/0138478 A1* | 5/2018 | Chan | H01M 50/325 |
| 2018/0261804 A1* | 9/2018 | Bayles | H01M 10/658 |

FOREIGN PATENT DOCUMENTS

| | | | | |
|---|---|---|---|---|
| DE | 102013210094 A1 | 10/2014 | | |
| EP | 2 784 869 A1 | 10/2014 | | |
| JP | 2000-243435 A | 9/2000 | | |
| JP | 2007-213939 A | 8/2007 | | |
| JP | 2009-176689 A | 8/2009 | | |
| JP | 2010-146774 A | 7/2010 | | |
| JP | 5753910 B2 | 7/2015 | | |
| JP | 2016-15328 A | 1/2016 | | |
| KR | 10-2012-0047927 A | 5/2012 | | |
| KR | 10-2016-0024187 A | 3/2016 | | |
| KR | 2023036606 A * | 3/2023 | ........... | G02F 1/1339 |
| WO | WO2013/077205 A1 | 5/2013 | | |
| WO | WO-2013141242 A1 * | 9/2013 | ........ | H01M 10/0525 |
| WO | WO-2023018907 A2 * | 2/2023 | ........ | H01M 10/0525 |

OTHER PUBLICATIONS

Sato et al., WO-2013141242-A1 Espacenet machine translation (Year: 2013).*
International Search Report (PCT/ISA/210) issued in PCT/KR2017/009974, dated Dec. 14, 2017.
Extended European Search Report, dated Dec. 12, 2018, for European Application No. 17851101.0.

* cited by examiner

RELATED ART
【Fig. 1】
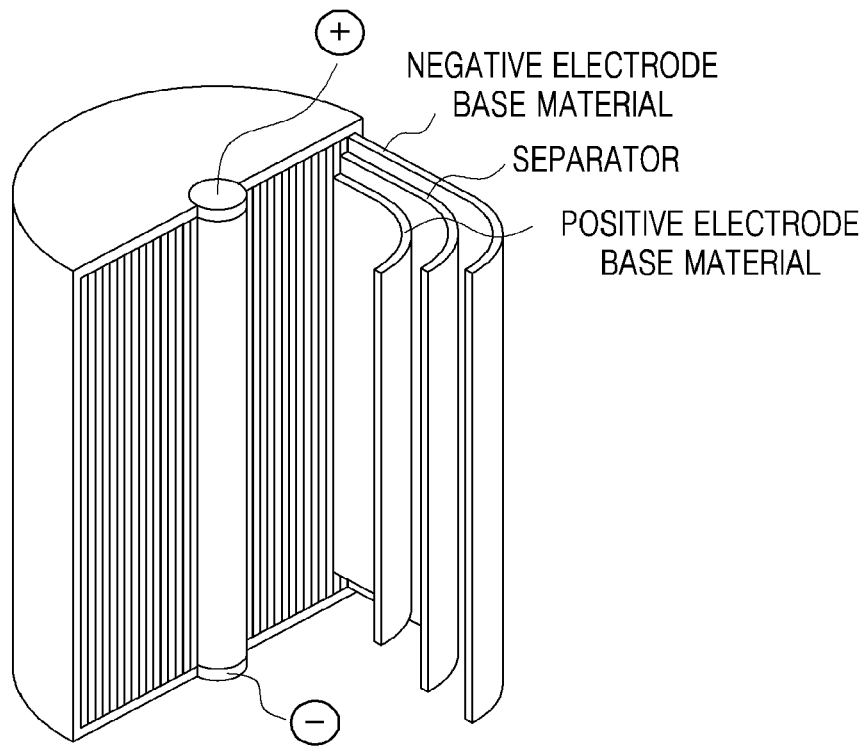
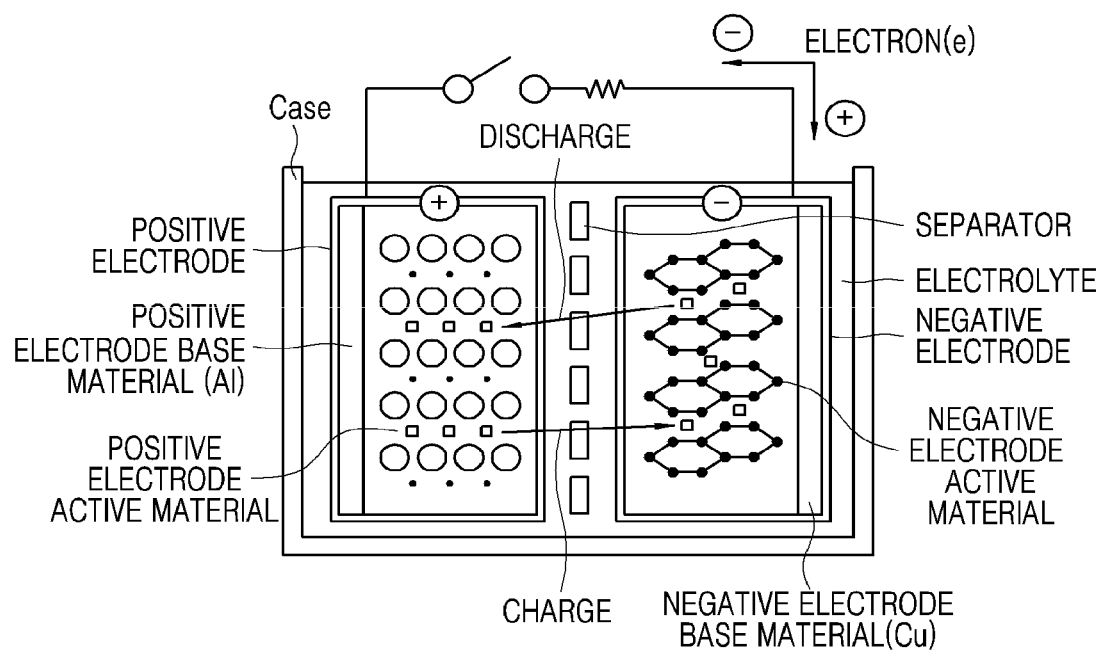

RELATED ART
【Fig. 2】
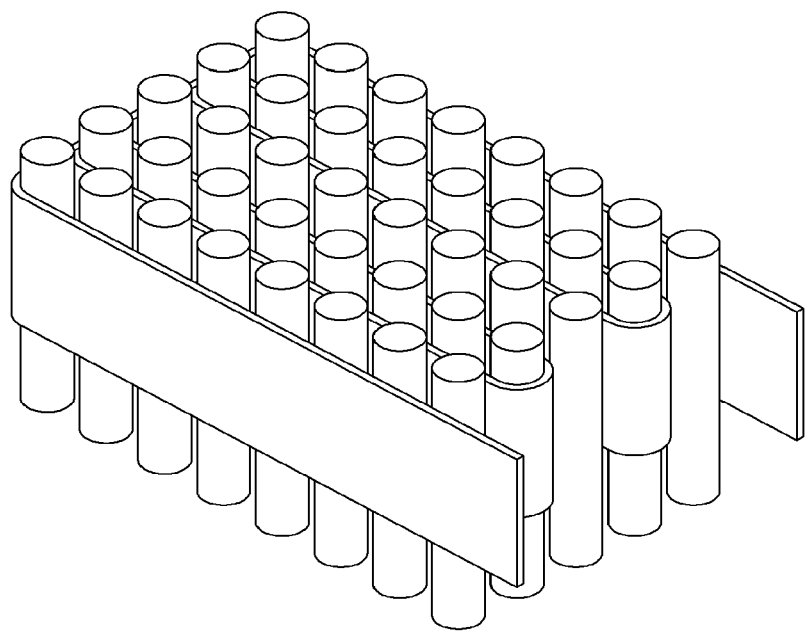

[Fig. 3]
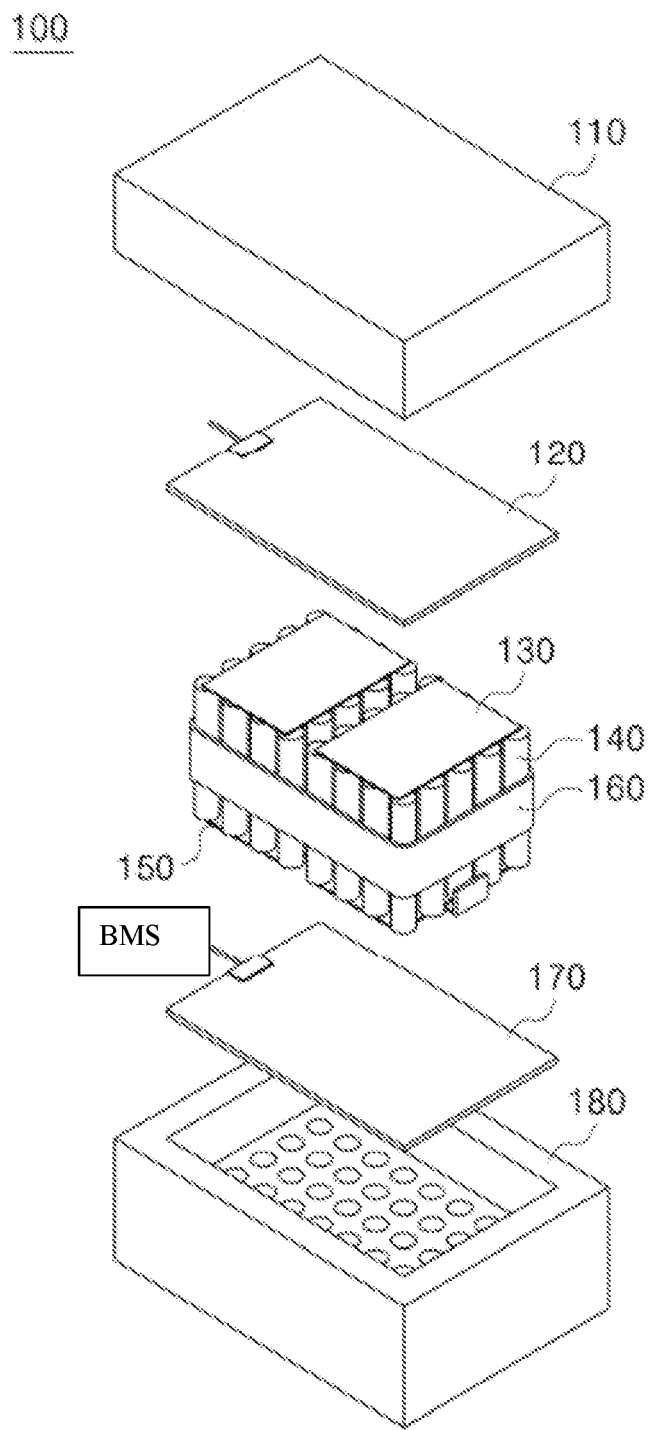

BATTERY PACK

TECHNICAL FIELD

The present disclosure relates to a battery pack, and more particularly, to a battery pack, the temperature of which is maintained within a certain range by using a heating component or a heat dissipating component attached thereto.

BACKGROUND ART

General battery packs include chargeable/dischargeable secondary batteries.

Since such a secondary battery is charged/discharged through an electro-chemical reaction, the battery pack is affected by an ambient temperature condition environment. When a charge/discharge progresses under an ultra-low temperature condition, internal reactions of the battery pack slow down, and thus, cause a problem in that the service life, stability, or operation performance of the battery is decreased.

Accordingly, in an apparatus such as an electric vehicle, a lead storage battery which is stably usable even under an environment of ultra-low temperatures (−30° C.) has been used as a battery. However, such a lead storage battery had a performance, which gradually deteriorated with charge/discharge, and a high self-discharge rate (usable for maximum of six months), and thus, the service life of the battery was short. Also, the lead storage battery had a great weight (12 Kg), and thus, had a limitation of decreasing the fuel efficiency of an electronic vehicle.

In comparison, Li-ion battery packs have low self-discharge rates and thus, have merits of long service life of battery (usable for maximum of three years) and a light weight (3 Kg). However, as described above, the Li-ion battery packs have a limitation in that operation performance thereof deteriorates under an environment of ultra-low temperatures. Thus, in order to use a Li-ion battery instead of a lead storage battery, the problem of deteriorating operation performance under such an environment of ultra-low temperatures should be solved.

In addition, when used for a long time, the Li-ion battery pack generates heat. In particular, a large-capacity battery pack involve more heat due to an increase in current quantity during charge or discharge. At this point, when the heat generated is not sufficiently removed, the performance of the battery pack may deteriorate or further cause fire or explosion. Accordingly, in order to maintain and improve the performance of the battery pack under a high temperature condition, an alternative to decrease the internal temperature of the battery pack is required.

In order to solve the problem of rise or drop of the internal temperature of such a battery pack, in related arts, a heating component or a heat dissipating component has been attached to a side surface of a cylindrical cell in a Li-ion battery pack to thereby increase or decrease the internal temperature of the battery pack.

Referring below to FIGS. 1 and 2, a cylindrical cell in which heating/heat-dissipating components according to related arts are attached to a side surface thereof will be described in detail.

FIG. 1 is a perspective view of the inside of a cylindrical cell.

FIG. 2 is an exemplary view of cylindrical cells with heating/heat-dissipating components attached to side surfaces thereof in accordance with a related art.

Referring to FIG. 1, a cylindrical cell has a structure in which a positive electrode base material, a negative electrode base material, and a separator are configured to be inserted into a can in a roll shape. In such a cylindrical cell structure, when a heating component is attached to a side surface of the cylindrical cell according to a related art cell and applies heat, the applied heat is transferred via the positive electrode base material, the negative electrode base material and the separator. Therefore, a problem of taking a long time to rise the internal temperature occurs.

In addition, referring to FIG. 2, the heating component or the heat dissipating component is attached in a zigzag shape to the side surfaces of the cylindrical cells. To assemble such a shape is difficult due to a repelling force between the heating/heat-dissipating components and a problem of configuring a plurality of cylindrical cells occurs.

Thus, in order to maintain the operation performance of a battery pack under a high or ultra-high temperature condition, it is necessary to develop an alternative attachment shape other than the side surface attachment for the heating or heat-dissipating component which adjusts the internal temperature of the battery pack.

RELATED ART DOCUMENT

Korean Patent Application Laid-Open Publication No. 2016-0024187.

DISCLOSURE OF THE INVENTION

Technical Problem

The present disclosure provides a battery pack which enables a stable operation thereof by allowing the internal temperature thereof to be adjusted quicker than batteries of related arts when the internal temperature thereof is a high or ultra-high temperature.

Technical Solution

In accordance with a first exemplary embodiment, a battery pack configured to include a heating component for applying heat to a plurality of cylindrical cells, includes: an upper end cover provided above the plurality of cylindrical cells to protect the inside the battery pack; a first metal panel positioned below the upper end cover and jointed to the upper portion of the cylindrical cells; a second metal panel jointed to a lower portion of the cylindrical cells; a holder configured to surround and fix an outer side surface of the entire cylindrical cells and the lower portion of the second metal panel; and a lower end cover positioned below the second metal panel and the holder to form a lower end portion of the battery pack.

The heating component may be attached between the first metal panel and the upper end cover or between the holder and the lower end cover, or may be attached between the first metal panel and the upper end cover and between the holder and the lower end cover.

The first metal panel and the second metal panel may have high thermal conductivities.

A heating pad, a heating wire, a liquid heater, or a metal heater may be used for the heating component.

In accordance with a second exemplary embodiment, a battery pack configured to include a heat-dissipating component for absorbing heat generated from a plurality of cylindrical cells, includes: an upper end cover provided above the plurality of cylindrical cells to protect the inside the battery pack; a first metal panel positioned below the upper end cover and jointed to the upper portion of the cylindrical cells; a second metal panel jointed to a lower portion of the cylindrical cells; a holder configured to surround and fix an outer side surface of the entire cylindrical cells and the lower portion of the second metal panel; and a lower end cover positioned below the second metal panel and the holder to form a lower end portion of the battery pack.

The heating component may be attached between the first metal panel and the upper end cover or between the holder and the lower end cover, or may be attached between the first metal panel and the upper end cover and between the holder and the lower end cover.

The first metal panel and the second metal panel may have high thermal conductivities.

A heat-dissipating pad, a heat-dissipating wire, a liquid cooler, or a metal cooler may be used for the heat-dissipating component.

In accordance with a third exemplary embodiment, a battery pack configured to include a heat-dissipating component for absorbing heat generated from a plurality of cylindrical cells and a heating component for applying heat to the plurality of cylindrical cells, includes: an upper end cover provided above the plurality of cylindrical cells to protect the inside the battery pack; a first metal panel positioned below the upper end cover and jointed to the upper portion of the cylindrical cells; a second metal panel jointed to a lower portion of the cylindrical cells; a holder configured to surround and fix an outer side surface of the entire cylindrical cells and the lower portion of the second metal panel; and a lower end cover positioned below the second metal panel and the holder to form a lower end portion of the battery pack.

The heat-dissipating component may be attached between the first metal panel and the upper end cover, and the heating component may be attached between the holder and the lower end cover; or the heating component may be attached between the first metal panel and the upper end cover, and the heat-dissipating component may be attached between the holder and the lower end cover.

The first metal panel and the second metal panel may have high thermal conductivities.

A heating pad, a heating wire, a liquid heater, or a metal heater may be used for the heating component, and a heat-dissipating pad, a heat-dissipating wire, a liquid cooler, or a metal cooler may be used for the heat-dissipating component.

Advantageous Effects

A battery pack in accordance with exemplary embodiments has heating components or heat-dissipating components attached above and below cylindrical cells, and thus, heat in the battery pack may be transferred quicker than in battery packs of related arts, a stable operation of the battery pack may be continued, and as the battery pack including a plurality of cylindrical cells may be stably assembled, a large-capacity battery may be easily produced.

BRIEF DESCRIPTION OF THE DRAWINGS

FIG. 1 is a perspective view of the inside of a cylindrical cell.

FIG. 2 is an exemplary view of cylindrical cells with heating/heat-dissipating components attached to side surfaces thereof in accordance with a related art.

FIG. 3 is a perspective view of a battery pack in accordance with an exemplary embodiment.

MODE FOR CARRYING OUT THE INVENTION

Hereinafter, exemplary embodiments will be described in detail with reference to contents illustrated in accompanying drawings. However, the present disclosure should not be construed as limited to the exemplary embodiments. Rather, these embodiments are provided so that this disclosure will be thorough and complete, and will fully convey the scope of the present invention to those skilled in the art.

In addition, the terms including ordinal numbers such as first and second may be used to describe various components, but the components are not limited by the terms. The terms are used only for the purpose of discriminating one component from other components. For example, a first component may be named as a second component within the scope of the present disclosure, and the second component may be nabbed as the first component. The terms used in the present disclosure are used to describe only a specific embodiment, and are not used to limit the present disclosure. Singular representation includes plural representation unless otherwise noted clearly different in context.

General terms used as widely as possible at present are selected as the terms used in this disclosure while a function thereof in the disclosure is considered, but the terms may be changed according to intention of those skilled in the art, precedent, emergence of new technique, or the like. In addition, in a specific case, there may also be terms arbitrarily selected by the applicant, and in this case, the meaning of the terms may be described in detail in the description section of the disclosure. Thus, the terms used in this disclosure should be defined not on the basis of the simple names thereof but on the basis of the meaning thereof and contents thereof entirely over the present disclosure.

1. 1. Battery Pack in Accordance with First Exemplary Embodiment

A battery pack in accordance with the exemplary embodiment includes, above and below cylindrical cells, a metal panel, a heating/heat-dissipating component, and a cover in this order with the cylindrical cells disposed at the central portion of the battery pack.

FIG. 3 is a perspective view of a battery pack in accordance with an exemplary embodiment.

Referring to FIG. 3, a battery pack 100 in accordance with a first exemplary embodiment is a battery pack which is configured to include plurality of cylindrical cells 140 and to have performance that can be maintained as an appropriate operating temperature is maintained by applying heat to the cylindrical cells 140 when the internal temperature of the battery pack is a low temperature. The battery pack includes: an upper end cover 110 which is provided above the plurality of cylindrical cells 140, forms the appearance of the battery pack 100, and protects the inside thereof; a first heating component 120 which is attached between the cylindrical cells 140 and the upper end cover 110 and applies heat to the cylindrical cells 140 when the internal temperature of the battery pack is low; a first metal panel 130 which is attached above the cylindrical cells 140 and electrically connected to the first heating component 120; a second metal panel 150 attached below the cylindrical cells 140 and connected to positive electrode terminals and negative electrode terminals of the cylindrical cells 140 through spot welding or laser welding; a holder 160 which surrounds and fixes side surfaces of the cylindrical cells 140 and the lower portion of the second metal panel 150 and prevents a series of fire; a second heating component 170 which applies heat to the cylindrical cells 140 to maintain the internal temperature of the battery pack, when the internal temperature of the battery pack is low, and is attached below the second metal panel 150 and the holder 160; and a lower end cover 180 which is positioned below the second heating component 170 and forms the lower end portion of the battery pack.

Here, the first metal panel 130 and the second metal panel 150 have high thermal conductivities and thereby allow the heat generated from the first heating component 120 and the second heating component 170 to be quickly transferred to the cylindrical cells 140. In addition, the first heating component 120 and the second heating component 170 may be attached between the first metal panel 130 and the upper end cover 110 or between the holder 160 and the lower end cover 180, or may be attached both between the first metal panel 130 and the upper end cover 110 and between the holder 160 and the lower end cover 180.

In addition, the first metal panel 130 and the second metal panel 150, which are welded to the cylindrical cells 140, are electrically connected not only to the first heating component 120 and the second heating component 170 but also to a BMS (not shown) which controls the operation of the battery pack. Such a BMS (not shown) measures the internal temperature of the battery pack 100 and controls the first heating component 120 and the second heating component 170 to be operated, when the temperature of the battery pack 100 is equal to or lower than a preset reference temperature. In general, since the temperature at which the performance of a Li-ion battery is decreased is −30° C., the preset reference temperature here is set to, for example, −10° C. to enable the battery pack to be stably operated.

In addition, the first heating component 120 and the second heating component 170 are configured in a shape so as to be respectively attached above and below the cylindrical cells 140 by using a heating pad, a heating wire, a liquid heater or a metal heater. The reason for attaching the heating components 120 and 170 as such above and below the cylindrical cells 140 is because repelling forces between the heating components are weaker, the heat transfer efficiency is higher, and the attachment method is simpler than those in the zigzag side surface attachment shape.

2. 2. Battery Pack in Accordance with Second Exemplary Embodiment

In the second exemplary embodiment, a heat-dissipating component is attached to a battery pack 100, which is different from the above-mentioned heating component-attached battery pack 100. Thus, when the internal temperature of the battery pack is high, heat of cylindrical cells 140 is dissipated to the outside and the performance of the battery pack may be maintained as an appropriate operating temperature is maintained.

As such, the battery pack 100 is configured to include: an upper end cover 110 which is positioned above a plurality of cylindrical cells 140, forms the appearance of the battery pack 100, and protects the inside thereof; a first heat-dissipating component 120 which is attached between the cylindrical cells 140 and the upper end cover 110 and dissipates heat of the cylindrical cells 140 to the outside when the internal temperature of the battery pack 100 is high; a first metal panel 130 which is attached above the cylindrical cells 140 and electrically connected to the first heating component 120; a second metal panel 150 attached below the cylindrical cells 140 and connected to positive electrode terminals and negative electrode terminals of the cylindrical cells 140 through spot welding or laser welding; a holder 160 which surrounds and fixes side surfaces of the cylindrical cells 140 and the lower portion of the second metal panel 150 and prevents a series of fire; a second heat-dissipating component 170 which dissipates heat of the cylindrical cells 140 to thereby maintain the internal temperature of the battery pack, when the internal temperature of the battery pack is high, and is attached below the second metal panel 150 and the holder 160; and a lower end cover 180 which is positioned below the second heating component 170 and forms the lower end portion of the battery pack.

Here, the first metal panel 130 and the second metal panel 150 have high thermal conductivities and thereby allow the heat generated from the cylindrical cells 140 to be quickly transferred to the first heat-dissipating component 120 and the second heat-dissipating component 170.

In addition, the first heat-dissipating component 120 and the second heat-dissipating component 170 may be attached between the first metal panel 130 and the upper end cover 110 or between the holder 160 and the lower end cover 180, or may be attached both between the first metal panel 130 and the upper end cover 110 and between the holder 160 and the lower end cover 180.

In addition, the first metal panel 130 and the second metal panel 150, which are welded to the cylindrical cells 140, are electrically connected not only to the first heat-dissipating component 120 and the second heat-dissipating component 170 but also to a BMS (not shown) which controls the operation of the battery pack. Such a BMS (not shown) measures the internal temperature of the battery pack 100 and controls the first heat-dissipating component 120 and the second heat-dissipating component 150 to be operated, when the temperature of the battery pack 100 is equal to or higher than a preset reference temperature. In general, since the temperature at which the performance of a Li-ion battery is decreased is 30° C., the preset reference temperature here is set to, for example, 20° C. to enable the battery pack to be stably operated.

In addition, the first heat-dissipating component 120 and the second heat-dissipating component 150 are configured in a shape so as to be respectively attached above and below the cylindrical cells 140 by using a heat-dissipating pad, a heat-dissipating wire, a liquid cooler or a metal cooler. The reason for attaching the heat-dissipating components 120 and 150 as such above and below the cylindrical cells 140 is because repelling forces between the heating components are weaker, the heat transfer efficiency is higher, and the attachment method is simpler than those in the zigzag side surface attachment shape.

3. 3. Battery Pack in Accordance with Third Exemplary Embodiment

In the third exemplary embodiment, a heating component and a heat-dissipating component are simultaneously attached to a battery pack 100, which is different from the above-mentioned battery packs 100 to which a heating component and a heat-dissipating component are respectively attached. When the internal temperature of the battery pack is out of a preset reference range, heat is applied to the cylindrical cells 140 or heat of cylindrical cells 140 is dissipated to the outside, and the performance of the battery pack can thereby be maintained as an operating temperature is maintained.

As such, the battery pack 100 is configured to include: an upper end cover 110 which is positioned above a plurality of cylindrical cells 140, forms an appearance of the battery pack 100, and protects the inside thereof; a heat-dissipating component 120 which is attached between the cylindrical cells 140 and the upper end cover 110 and dissipates heat of the cylindrical cells 140 to the outside when the internal temperature of the battery pack 100 is high; a first metal panel 130 which is attached above the cylindrical cells 140 and electrically connected to the first heating component 120; a second metal panel 150 attached below the cylindrical cells 140 and connected to positive electrode terminals and negative electrode terminals of the cylindrical cells 140 through spot welding or laser welding; a holder 160 which surrounds and fixes side surfaces of the cylindrical cells 140 and the lower portion of the second metal panel 150 and prevents a series of fire; a heating component 170 which applies heat to the cylindrical cells 140 to thereby maintain the internal temperature the battery pack 100, when the internal temperature of the battery pack 100 is low, and is attached below the second metal panel 150 and the holder 160; and a lower end cover 180 which is positioned below the heating component 170 and forms the lower end portion of the battery pack 100.

Here, the first metal panel 130 and the second metal panel 150 have high thermal conductivities and thereby allow the heat generated from the cylindrical cells 140 and the heating component 170 to be quickly transferred.

In addition, the heat-dissipating component 120 may be attached between the first metal panel 130 and the upper end cover 110, and the heating component 170 may be attached between the holder 160 and the lower end cover 180. Alternatively, the heating component 120 may be attached between the first metal panel 130 and the upper end cover 110 and the heat-dissipating component 120 may be attached between the holder 160 and the lower end cover 180.

In addition, the first metal panel 130 and the second metal panel 170, which are welded to the cylindrical cells 140, are electrically connected not only to the heat-dissipating component 120 and the heating component 170 but also to a BMS which controls the operation of the battery pack. Such a BMS measures the internal temperature of the battery pack 100 and controls the heat-dissipating component 120 to be operated, when the temperature of the battery pack 100 is equal to or lower than a first preset reference temperature, and controls the heating component 150 to be operated, when the temperature of the battery pack 100 is equal to or higher than a second preset reference temperature. In general, since the temperature at which the performance of a Li-ion battery is decreased is lower than −30° C. or equal to or higher than 30° C., the first preset reference temperature here is set to, for example, −5° C., and the second preset reference temperature is set to, for example, −15° C. to enable the battery pack to be stably operated.

In addition, a heating pad, a heating wire, a liquid heater or a metal heater is used for the heating component 150, and a heat-dissipating pad, a heat-dissipating wire, a liquid cooler or a metal cooler is used for the heat-dissipating component 120. The reason for attaching the heat-dissipating component 120 and the heating component 150 as such above and below the cylindrical cells 140 is because repelling forces between the heating components are weaker, the heat transfer efficiency is higher, and the attachment method is simpler than those in the zigzag side surface attachment shape. In addition, the reason for disposing the heat-dissipating component 120 above the cylindrical cells 140 and disposing the heating component 150 below the circular dells 140 is because the battery pack should be configured such that heat generated from the cylindrical cells 140 is moved upward so as to be dischargeable to the outside through the heat-dissipating component 120, and heat generated from the heating component 150 may be applied to the cylindrical cells 140.

Although the technical concept of the present invention has been specifically described according to the above exemplary embodiments, it should be understood that the above embodiments are provided not to limit but to describe the technical concepts. Furthermore, those skilled in the art relating to technical field of the present disclosure may realize various embodiments within the techniques set forth in claims.

What is claimed is:

1. A battery pack comprising:
a plurality of cylindrical cells, the plurality of cylindrical cells including exterior cells arranged at an outer periphery as outermost cells from among plurality of cylindrical cells and interior cells arranged at interior locations as inner cells from among the plurality of cylindrical cells;
an upper end cover provided above the plurality of cylindrical cells to protect the inside of the battery pack;
a first metal panel positioned below the upper end cover and welded to the upper portion of the plurality of cylindrical cells;
a second metal panel welded to a lower portion of the plurality of cylindrical cells;
a holder configured to surround an outer side surface of the plurality of cylindrical cells as a whole by encircling the plurality of cylindrical cells at the exterior cells, and to fix the plurality of the cylindrical cells to the lower portion of the second metal panel, wherein, among the exterior cells and the interior cells of the plurality of cylindrical cells, the holder directly contacts only the exterior cells of the plurality of cylindrical cells;
a lower end cover positioned below the second metal panel and the holder to form a lower end portion of the battery pack; and
a heat-dissipating component for absorbing heat generated from the plurality of cylindrical cells and a heating component for applying heat to the plurality of cylindrical cells,
wherein the heat-dissipating component is attached between the first metal panel and the upper end cover, and the heating component is attached between the second metal panel and the lower end cover,
wherein the first metal panel and the second metal panel are electrically connected to the heat-dissipating component and the heating component, respectively,
wherein the second metal panel is interposed between the heating component and the plurality of cylindrical cells, and directly contacts the heating components,
wherein the heating component directly heats the second metal panel, and heat is transferred through the second metal panel to directly heat the plurality of cylindrical cells,
wherein the heating component is electrically connected to a battery management system (BMS), and
wherein the BMS is configured to measure an internal temperature of the battery pack and control the heating component.

2. The battery pack of claim 1, wherein the first metal panel and the second metal panel have high thermal conductivities.

3. The battery pack of claim 1, wherein a heating pad, a heating wire, a liquid heater, or a metal heater is used for the heating component, and a heat-dissipating pad, a heat-dissipating wire, a liquid cooler, or a metal cooler is used for the heat-dissipating component.

4. The battery pack of claim 1, wherein the first metal panel and the second metal panel are further electrically connected to the BMS that measures the internal temperature of the battery pack.

\* \* \* \* \*